US012754546B2

(12) United States Patent
Schafer

(10) Patent No.: US 12,754,546 B2
(45) Date of Patent: Oct. 6, 2026

(54) GAS TURBINE ENGINE DRONE INSPECTION SYSTEM

(71) Applicant: RTX CORPORATION, Farmington, CT (US)

(72) Inventor: Bradley C. Schafer, Ellington, CT (US)

(73) Assignee: RTX CORPORATION, Farmington, CT (US)

(*) Notice: Subject to any disclaimer, the term of this patent is extended or adjusted under 35 U.S.C. 154(b) by 230 days.

(21) Appl. No.: 18/497,600

(22) Filed: Oct. 30, 2023

(65) Prior Publication Data

US 2025/0137386 A1 May 1, 2025

(51) Int. Cl.
*G05D 1/00* (2024.01)
*B64U 101/26* (2023.01)
(Continued)

(52) U.S. Cl.
CPC ................. *G05D 1/00* (2013.01); *F01D 5/12* (2013.01); *F01D 21/003* (2013.01); *G01M 15/14* (2013.01); *G01N 21/9515* (2013.01); *G06T 7/0008* (2013.01); *H04N 23/555* (2023.01); *B64U 2101/26* (2023.01); *B64U 2101/30* (2023.01); *B64U 2101/70* (2023.01); *F05D 2260/80* (2013.01); *F05D 2270/709* (2013.01); *G01N 2021/8887* (2013.01); *G06T 2207/20084* (2013.01)

(58) Field of Classification Search
None
See application file for complete search history.

(56) References Cited

U.S. PATENT DOCUMENTS 9,382,002 B1 7/2016 Cavote
10,520,943 B2 12/2019 Martirosyan et al.
(Continued)

FOREIGN PATENT DOCUMENTS

CN 107709158 A * 2/2018 ................ B64F 5/60
CN 112904877 6/2021
(Continued)

OTHER PUBLICATIONS

Machine translation of CN-107709158-A (Year: 2018).*
(Continued)

*Primary Examiner* — Kenneth M Dunne
(74) *Attorney, Agent, or Firm* — Carlson, Gaskey & Olds, P.C.

(57) ABSTRACT

A system includes at least one drone that is equipped with an imaging device and a light source. At least one processor is configured to: operate the at least one drone to fly into a gas turbine engine to a first position with respect to a component in the gas turbine engine, operate the imaging device and the light source to take an image a target surface of the component from the first position, identify whether the image includes an obstruction blocking a portion of the target surface from view of the imaging device, in response to identifying the obstruction, operate the at least one drone to fly to a second position from which there is a line-of-sight to the target surface without the obstruction, and operate the imaging device and the light source to obtain an unobstructed image of the target surface from the second position.

16 Claims, 2 Drawing Sheets

(51) Int. Cl.

| | |
|---|---|
| ***B64U 101/30*** | (2023.01) |
| ***B64U 101/70*** | (2023.01) |
| ***F01D 5/12*** | (2006.01) |
| ***F01D 21/00*** | (2006.01) |
| ***G01M 15/14*** | (2006.01) |
| ***G01N 21/88*** | (2006.01) |
| ***G01N 21/95*** | (2006.01) |
| ***G06T 7/00*** | (2017.01) |
| ***H04N 23/50*** | (2023.01) |

(56) References Cited

U.S. PATENT DOCUMENTS

| | | | | |
|---|---|---|---|---|
| 10,679,066 | B2 | 6/2020 | Pathak et al. | |
| 2014/0168420 | A1* | 6/2014 | Naderhirn | G01M 5/0091 348/128 |
| 2018/0101173 | A1* | 4/2018 | Banerjee | G08G 5/80 |
| 2018/0131864 | A1 | 5/2018 | Bisti | |
| 2018/0290748 | A1* | 10/2018 | Corban | G06T 19/006 |
| 2018/0330027 | A1* | 11/2018 | Sen | B08B 13/00 |
| 2019/0294883 | A1* | 9/2019 | Pathak | F01D 5/005 |
| 2019/0338666 | A1* | 11/2019 | Finn | G06T 3/4038 |
| 2021/0006725 | A1* | 1/2021 | Niezrecki | H04N 23/695 |
| 2021/0261251 | A1* | 8/2021 | Claybrough | B64F 5/00 |
| 2021/0356255 | A1* | 11/2021 | Sweers | G01B 5/18 |
| 2022/0194578 | A1* | 6/2022 | Litton | G05D 1/101 |
| 2023/0244234 | A1 | 8/2023 | Henry et al. | |
| 2025/0028870 | A1* | 1/2025 | Martensen | G06F 30/15 |

FOREIGN PATENT DOCUMENTS

| | | | | |
|---|---|---|---|---|
| KR | 20200114858 | | 10/2020 | |
| WO | WO-2017153912 | A1 * | 9/2017 | B64F 5/20 |
| WO | 2023128008 | | 7/2023 | |

OTHER PUBLICATIONS

Wikipedia, "Simultaneous localization and Mapping", Jul. 2023, Wikipedia (Year: 2023).*

European Search Report for European Patent Application No. 24209962.0 mailed Apr. 2, 2025.

* cited by examiner

GAS TURBINE ENGINE DRONE INSPECTION SYSTEM

BACKGROUND

Gas turbine engines are required to be inspected, usually at predetermined intervals according to a maintenance schedule. Such inspections are often invasive, time-consuming, and expensive because the engine (and thus aircraft) is out-of-service during inspection. Inspections, however, are key to identifying distress in engine components, which may then require repair or replacement. Some inspections need to be performed after each flight and can be difficult to conduct.

SUMMARY

A system for inspection of a gas turbine engine according to an example of the present disclosure includes at least one drone operable for flight and equipped with an imaging device and a light source, and at least one processor configured to operate the at least one drone to fly into a gas turbine engine to a first position with respect to a component in the gas turbine engine, operate the imaging device and the light source to take an image a target surface of the component from the first position, and identify whether the image includes an obstruction blocking a portion of the target surface from view of the imaging device. In response to identifying the obstruction, the at least one drone operates to fly to a second position from which there is a line-of-sight to the target surface without the obstruction, and operates the imaging device and the light source to obtain an unobstructed image of the target surface from the second position.

In a further embodiment of any of the foregoing embodiments, the component is a fan blade and the obstruction is an inlet guide vane.

In a further embodiment of any of the foregoing embodiments, the processor includes one or more neural networks configured to identify whether the image includes the obstruction.

In a further embodiment of any of the foregoing embodiments, the one or more neural networks is configured to identify an abnormality in the target surface from the image.

In a further embodiment of any of the foregoing embodiments, the one or more neural networks is configured to navigate the at least one drone.

In a further embodiment of any of the foregoing embodiments, the at least one drone includes first and second drones. The imaging device of the first drone takes the image of the target surface from the first position and the image device of the second drone taking the unobstructed image from the second position.

In a further embodiment of any of the foregoing embodiments, the imaging device includes a borescope.

A further embodiment of any of the foregoing embodiments includes a docking station on an aircraft associated with the gas turbine engine from which the at least one drone is deployed to fly into the gas turbine engine.

A further embodiment of any of the foregoing embodiments includes an operator interface configured to permit an operator to take images using the imaging device.

A method for inspection of a gas turbine engine according to an example of the present disclosure includes operating at least one drone to fly into a gas turbine engine to a first position with respect to a component in the gas turbine engine. The at least one drone is equipped with an imaging device and a light source. The imaging device and the light source are operated to take an image a target surface of the component from the first position and identify whether the image includes an obstruction that blocks a portion of the target surface from view of the imaging device. In response to identifying the obstruction, the at least one drone operates to fly to a second position from which there is a line-of-sight to the target surface without the obstruction, and operates the imaging device and the light source to obtain an unobstructed image of the target surface from the second position.

In a further embodiment of any of the foregoing embodiments, the identifying of whether the image includes an obstruction is performed using one or more neural networks.

A further embodiment of any of the foregoing embodiments includes identifying from the image whether the target surface includes an abnormality.

In a further embodiment of any of the foregoing embodiments, the at least one drone includes first and second drones, and includes coordinating operation of the first and second drones to take the image of the target surface from the first position with the imaging device of the first drone and take the unobstructed image from the second position with the imaging device of the second drone.

In a further embodiment of any of the foregoing embodiments, the imaging device includes a borescope, and including operating the drone to deploy the borescope to take the unobstructed image.

A further embodiment of any of the foregoing embodiments includes operating the at least one drone to deploy from a docking station on an aircraft that is associated with the gas turbine engine.

A further embodiment of any of the foregoing embodiments includes manually taking the image through an operator interface that is configured to operate the imaging device.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
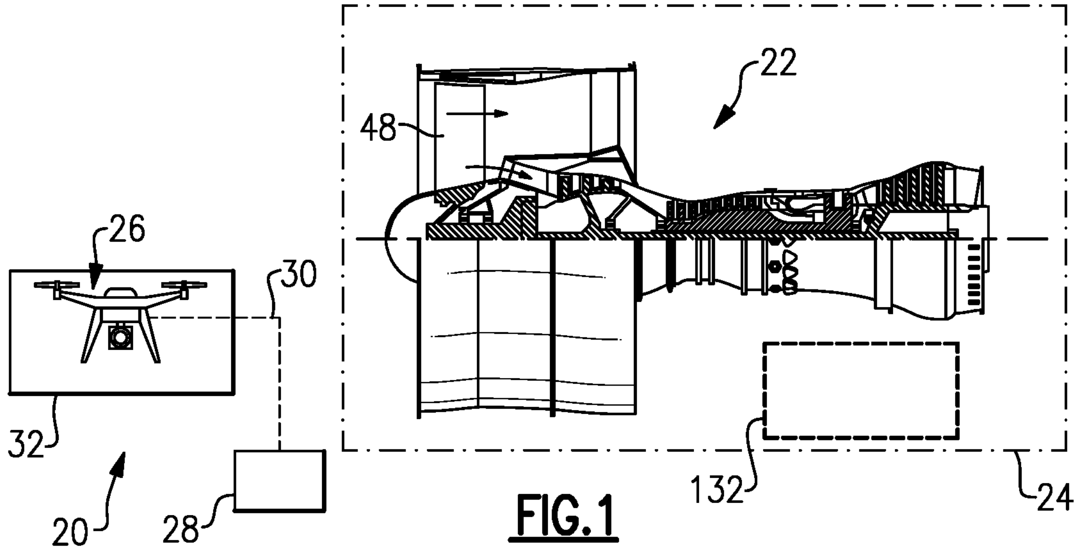
FIG. 1 illustrates a system for drone inspection of a gas turbine engine.

In this disclosure, like reference numerals designate like elements where appropriate and reference numerals with the addition of one-hundred or multiples thereof, if used, designate modified elements that are understood to incorporate the same features and benefits of the corresponding elements. Terms such as "first" and "second" used herein are to differentiate that there are two architecturally distinct components or features. Furthermore, the terms "first" and "second" are interchangeable in that a first component or feature could alternatively be termed as the second component or feature, and vice versa.

DETAILED DESCRIPTION

FIG. 1 schematically illustrates a system 20 for inspection of a gas turbine engine 22 that is associated with an aircraft, which is generally designated at 24. As will be appreciated from this disclosure, the system 20 provides for automated, intelligent inspection that may reduce or replace the need for manual inspection in which maintenance personnel must enter the engine 22, particularly engines with long inlets that are confined and unconducive to easy manual inspection.

The system 20 includes at least one drone 26 and a controller 28. The drone 26 may also be referred to as an unmanned aerial vehicle. The controller 28 is in communication with the drone 26, such as by a wired or wireless connection 30. As an example, the drone 26 is a propeller-based, multirotor design, such as a quadcopter. In general, the drone 26 is miniature in size so as to be able to enter into the engine 22 and maneuver therein with clearance to be able to rotate and traverse the engine components being inspected.

In the example shown, the system 20 includes a docking station 32 from which the drone 26 deploys for inspection of the engine 22. For example, the system 20 as shown is a "non-dedicated" system that is remotely located from the aircraft 24. In that regard, the docking station 32 may be mobile, such as on a wheeled cart or vehicle or small enough to fit in a hand-carried case or backpack such that it can be moved to into proximity of the engine 22 or moved to service multiple engines across different aircrafts. Alternatively, however, the system 20 is a "dedicated" system that is intended to service the engine or engines of a single aircraft and, in that regard, the docking station 32 is on the aircraft 24, as designated at 132. The docking station 32 (or 132) serves as a point for take-off and landing of the drone 26, but may also be configured to refuel or recharge the drone 26, and may include a computerized device or other electronics for communicating with and/or controlling flight and operation of the drone 26.

Figure 2:
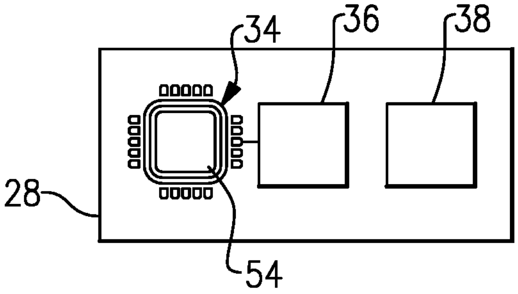
FIG. 2 illustrates a controller for operating the drone.

FIG. 2 illustrates the controller 28, which in this example includes at least one processor 34, a memory 36, and, optionally, an operator interface 38, such as a screen, keyboard, and/or input device (e.g., a mouse). In one example, the controller 28 is in the docking station 32, but it may alternatively be in a computerized device (e.g., a tablet), in the drone 26, or split among the drone 26, the docking station 32, and/or a computerized device. Instructions for operating the drone 26 and its equipment are saved in the memory 36 and executed by the processor or processors 34. In that regard, there may be multiple processors 34 located across the drone 26, docking station 32, and/or computerized device or devices that participate in executing the instructions.

Figure 3:
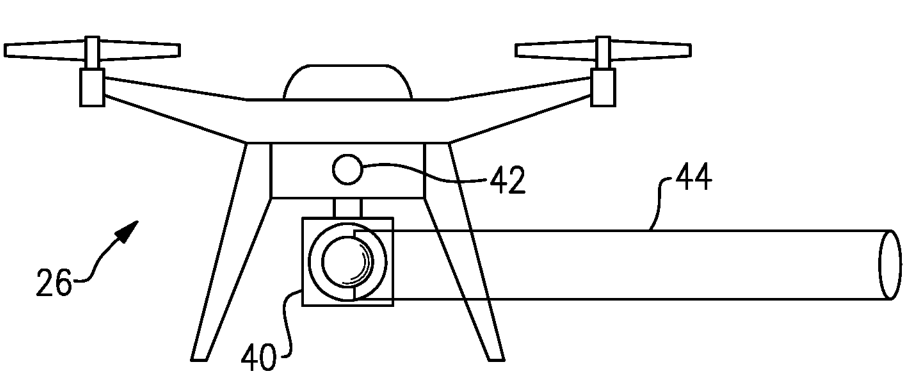
FIG. 3 illustrates an example of a drone.

FIG. 3 illustrates the drone 26, which in this example is equipped with an imaging device 40, such as a camera, and a light source 42. Optionally, the drone 26 is also equipped with sensors to perform an additional non-destructive inspection, such as an eddy current inspection to confirm an anomaly identification. It is to be appreciated that although a single drone 26 is shown here with both the imaging device 40 and the light source 42, such equipment may alternatively be split among two or more drones that operate in coordination, such as one drone that has the imaging device 40 (i.e., a "camera drone") and another drone that has the light source 42 (i.e., a "light drone"). Multiple drones could be deployed in a swarm to either reduce the time to completely inspect one engine or conversely perform inspections on multiple aircraft simultaneously. Optionally, the imaging device 40 additionally includes a borescope 46. For example, the borescope 46 is an optical instrument that includes a rigid or flexible tube and one or more optical lenses through which a camera is linked for taking images or video. The borescope 46 may be telescopic or foldable such that it can be stowed in a compact, stored position on the drone 26 when not in use and then deployed to an extended position to permit imaging in a confined or difficult-to-access space in the engine 22.

Figure 4:
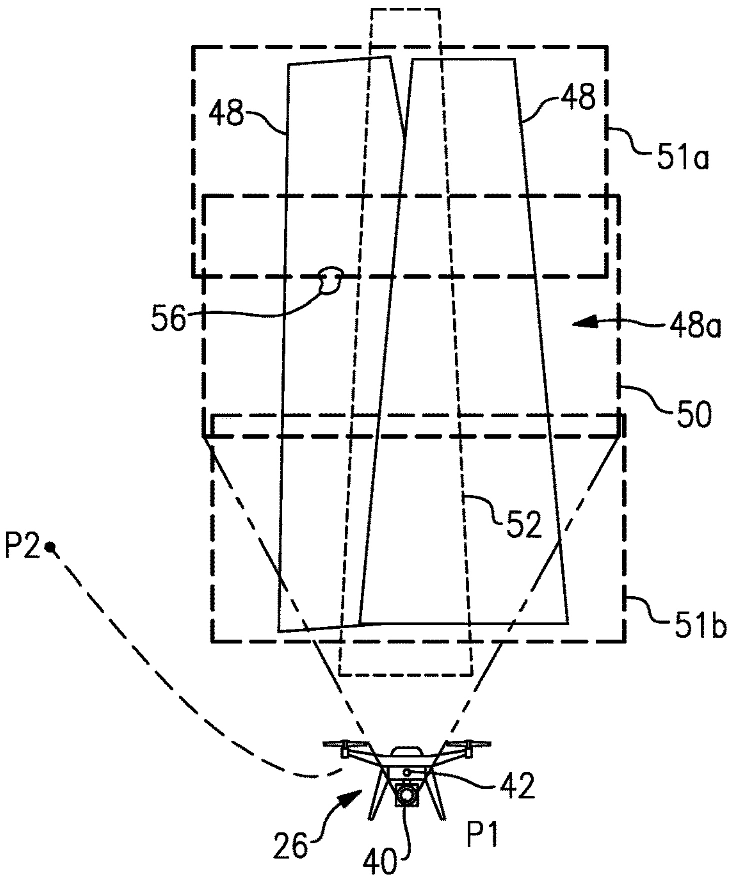
FIG. 4 illustrates a drone taking an image of a target surface from a first position.

The processor 34 of the controller 28 is configured to operate the drone 26, in accordance with instructions stored in the memory 36, to fly into the gas turbine engine 22 for inspection and perform the functions described herein. The following examples are based on inspection of fan blades 48 of the engine 22, although it is to be understood that the system 20 is not limited and will be applicable for inspection of other engine components, as well as non-engine implementations. The processor 34 operates the drone 26 to fly to a first position P1 with respect to the fan blades 48, as shown in FIG. 4. The position P1 may be a predetermined starting position for the drone 26, and the drone 26 may navigate to the position P1 based upon one or more reference locations in the engine 22 that are identified optically using the imaging device 40.

Once at the first position P1, the processor operates the imaging device 40 and light source 42 of the drone 26 to take an image 50 of a target surface **48*a* of the fan blades 48. In this case, however, there is an obstruction 52 (shown in phantom) between the imaging device 40 and the target surface 48*a*. In this example, the obstruction 52 is an inlet guide vane located forward of the fan blades 48 that blocks the view of a portion of the target surface 48*a* that is to be inspected. Thus, full inspection cannot be completed based on the image 50 from the first position P1. The obstruction 52** is not limited to guide vanes and other examples include, but are not limited to, platforms, casings, and adjacent blades that overlap so as to be in the field of view.

Of course, not all images will necessarily be obstructed, and the processor 34 thus performs an analysis to identify whether the image 50 includes an obstruction. In this regard, the processor 34 (FIG. 2) includes one or more neural networks 54 that are configured to identify whether the image 50 includes the obstruction. A neural network is a network of artificial neurons or nodes that are operable for artificial intelligence learning and problem-solving. In that regard, the neural network 54 is trained beforehand based on examples of images (real or virtual) with and without obstructions so that the processor 34 can analyze instant images taken by the drone 26 and identify, based on the trained images, whether the instant image contains an obstruction. As an example, the neural network 54 is trained to asses and superimpose multiple images to obtain a photographic "map" of the blade 48 under inspection. For instance, as shown in FIG. 4, multiple images 50/**51*a*/51*b* are taken at different locations of the blade 48 under inspection, and the images 50/51*a*/51*b* are subsequently superimposed to produce a composite image of the entire blade 48. Additionally or alternatively, the obstruction 52 is identified manually by an operator who inspects the image, determines whether an obstruction is present, and then provides an input of the result of the obstruction determination (e.g., through the operator interface 38). It is to be further appreciated that the neural network 54 may also be used for navigation of the drone 26. For example, the neural network 54 is trained beforehand based on examples of reference features in the engine 22 so that the processor 34 can analyze instant images taken by the drone 26 and, based on the trained images, create a spatial map that can be referenced for present and future navigation in the engine 22**.

Figure 5:
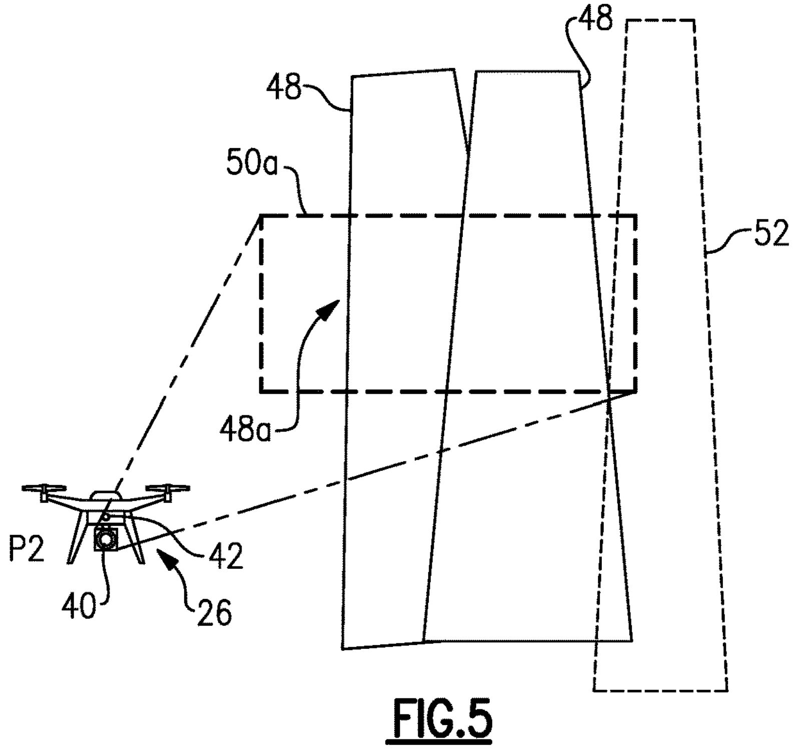
FIG. 5 illustrates a drone taking an image of the target surface from a second position.

If no obstruction is identified in the image 50, the processor 34 operates the drone 26 to move on to a new first position for inspection of another target surface, such as another portion of a blade or blades 48. If, however, an obstruction is identified, the processor 34 responsively operates the drone 26 to fly to a second position P2, as also shown in FIG. 5, from which there is a line-of-sight to the target surface 48*a* without the obstruction 52 in order to take an unobstructed image 50*a*. An "unobstructed" image does not necessarily have no obstructions but, rather, refers to an image that is less obstructed in comparison to a prior obstructed image (e.g., by areal percentage). That is, the target surface 48*a* is not fully observable at the angle of the line-of-sight from the first position P1, but may be more fully observable from a different angle of the line-of-sight from the second position P2. The neural network 54 may also identify where the second position P2 is to be located in order to provide a higher probability for a better (less obstructed) view of the target surface 48*a*. For instance, based on the position of the obstruction 52 in the image 50, a second position P2 that is located in the opposite direction from the position of the obstruction is likely to provide a better line-of-sight past the obstruction 52 to the target surface 48*a*. The position P2 may alternatively be a preprogrammed location relative to P1, such as a position that is a predetermined distance from P1 on the same plane as P1 and the drone 26 (and with the drone 26 rotated to be directed at the target surface 48*a*). Additionally, if a high percentage of the target surface 48*a* is still obstructed in the second image 50*a* taken from position P2, the processor 34 operates the drone 26 to fly to a new second position P2 to retake the image 50*a*. The processor 34 may repeat the re-positioning and imaging across multiple second positions until a suitably unobstructed image is taken. Thus, the path of travel of the drone 26 is ultimately determined by the positions where the drone 26 is able to capture a full, unobstructed view of the target surface 48*a*, or at least multiple images that, when viewed in total, provide unobstructed views of all portions of the target surface 48*a*.

In further examples, the positions P1 and P2 may take into account information that the drone 26 has about the engine 22. For instance, the drone 26 may have information about the engine model, number of blades 48, the size and spacing of the blades 48, and the presence, size, and spacing of guide vanes stored in the memory 36 such that the drone 26 can move and operate more intelligently with respect to the locations of yet-to-be inspected blades 48 and already-inspected blades 48. For instance, the size and spacing of the guide vanes may not permit any single position, or even a combination of multiple positions, from which a fully unobstructed image or images can be taken. In that case, knowing beforehand that reiteratively moving to new second positions P2 would be in vain, the drone 26 may instead move to a second position in which the borescope 44 can be deployed past the guide vanes to get a clear image of a target surface.

In a further example in which the drone 26 does not have information of the number of blades 48, the drone 26 may utilize the imaging device 40 to identify and "count" the number of blades 48 as it inspects or prior to beginning inspection, such that it can determine whether all of the blades have been inspected for completion of an inspection mission.

In a further example, rather than a single drone 26, there are two or more drones 26 that operate in coordination. For instance, rather then the single drone 26 moving from the first position P1 to the second position P2, the processor 34 coordinates operation of a second drone 26 to move to position P2 to take the image 50*a*.

The processor 34 is also operable to identify whether the target surface 48*a* contains an abnormality 56 (FIG. 4). An abnormality may be a crack, a region of corrosion, or other region of distress that is optically differentiated from regions of the component that contain no abnormalities. For example, the neural network 54 is configured to identify the abnormality 56. Similar to identifying the obstruction 52, the neural network 54 is trained beforehand based on examples of images (real or virtual) with and without abnormalities so the processor 34 can analyze instant images taken by the drone or drones 26 and identify, based on the trained images, whether the instant image contains an abnormality 56. Additionally, the operator interface 38 permits an operator to intervene in the inspection and take images using the imaging device 40 of the drone 26. For example, the operator instructs the drone 26 to take additional images, such as images to confirm presence of an abnormality 56, images at additional positions or angles, or images with different lighting and/or imaging settings. In accordance with the operator request and information saved about the images, positions, and flight path of the inspection, the processor 34 operates the drone 26 to navigate to positions where additional images will be taken.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A system for inspection of a gas turbine engine, the system comprising:
- at least one drone operable for flight and equipped with an imaging device and a light source, the imaging device including a borescope that is moveable between a stowed, compact position and a deployed, extended position;
- at least one processor configured to:
  - operate the at least one drone to fly into an interior of a gas turbine engine to a first position with respect to a component in the gas turbine engine,
  - operate the imaging device and the light source to take an image a target surface of the component from the first position,
  - identify whether the image includes an obstruction blocking a portion of the target surface from view of the imaging device,
  - in response to identifying the obstruction, operate the at least one drone to fly to a second position from which there is a line-of-sight to the target surface without the obstruction, and
  - operate the imaging device and the light source to obtain an unobstructed image of the target surface from the second position.

2. The system as recited in claim 1, wherein the component is a fan blade and the obstruction is an inlet guide vane.

3. The system as recited in claim 1, wherein the processor includes one or more neural networks configured to identify whether the image includes the obstruction.

4. The system as recited in claim 3, wherein the one or more neural networks is configured to identify an abnormality in the target surface from the image.

5. The system as recited in claim 3, wherein the one or more neural networks is configured to navigate the at least one drone.

6. The system as recited in claim 1, wherein the at least one drone includes first and second drones, the imaging device of the first drone taking the image of the target surface from the first position and the image device of the second drone taking the unobstructed image from the second position.

7. The system as recited in claim 1, further comprising a docking station on an aircraft associated with the gas turbine engine from which the at least one drone is deployed to fly into the gas turbine engine.

8. The system as recited in claim 1, further comprising an operator interface configured to permit an operator to take images using the imaging device.

9. The system as recited in claim 1, wherein the at least one processor is configured, based on images of the gas turbine engine, to generate a spatial map of the gas turbine engine for navigation of the engine.

10. A method for inspection of a gas turbine engine, the method comprising:

operating at least one drone to fly into an interior of a gas turbine engine to a first position with respect to a component in the gas turbine engine, the at least one drone is equipped with an imaging device and a light source, the imaging device including a borescope that is moveable between a stowed, compact position and a deployed, extended position;

operating the imaging device and the light source to take an image a target surface of the component from the first position;

identifying whether the image includes an obstruction that blocks a portion of the target surface from view of the imaging device;

in response to identifying the obstruction, operating the at least one drone to fly to a second position from which there is a line-of-sight to the target surface without the obstruction, and operating the operating the at least one drone to deploy the borescope from the stowed position to the deployed position to, along with the light source, obtain an unobstructed image of the target surface from the second position.

11. The method as recited in claim 10, wherein the identifying of whether the image includes an obstruction is performed using one or more neural networks.

12. The method as recited in claim 11, further comprising identifying from the image whether the target surface includes an abnormality.

13. The method as recited in claim 10, wherein the at least one drone includes first and second drones, and including coordinating operation of the first and second drones to take the image of the target surface from the first position with the imaging device of the first drone and take the unobstructed image from the second position with the imaging device of the second drone.

14. The method as recited in claim 10, further comprising operating the at least one drone to deploy from a docking station on an aircraft that is associated with the gas turbine engine.

15. The method as recited in claim 10, further comprising manually taking the image through an operator interface that is configured to operate the imaging device.

16. The method as recited in claim 10, further including generating a spatial map of the gas turbine engine based on images of the gas turbine engine, and navigating the at least one drone to fly in accordance with the spatial map.

* * * * *